(12) United States Patent
Yunaska

(10) Patent No.: US 6,688,623 B1
(45) Date of Patent: Feb. 10, 2004

(54) HUMAN POWERED VEHICLE DRIVE MECHANISM

(76) Inventor: Robert L. Yunaska, 102 Seapath Estate Dr., Wrightsville Beach, NC (US) 28480

( * ) Notice: Subject to any disclaimer, the term of this patent is extended or adjusted under 35 U.S.C. 154(b) by 0 days.

(21) Appl. No.: 10/051,961

(22) Filed: Jan. 16, 2002

(51) Int. Cl.$^7$ .............................................. B62M 1/00
(52) U.S. Cl. ...................... 280/233; 280/234; 280/244; 280/247
(58) Field of Search ................. 280/233, 234, 280/244, 246, 247

(56) References Cited

U.S. PATENT DOCUMENTS

| | | | |
|---|---|---|---|
| 377,610 A | 2/1888 | Goodsell | 280/259 |
| 384,150 A | 6/1888 | Goodsell | 280/259 |
| 547,422 A | 10/1895 | Dean | 280/288.4 |
| 577,269 A | 2/1897 | Powley | 280/288.4 |
| 585,421 A | 6/1897 | Bemis | 280/253 |
| 616,021 A | 12/1898 | Schaibly | 280/253 |
| 621,465 A | 3/1899 | Storms | 280/288.4 |
| 690,180 A | 12/1901 | Pierson | 280/253 |
| 2,207,305 A | 7/1940 | Souhart | 280/253 |
| 2,416,092 A | 2/1947 | Genin | 280/253 |
| 2,510,013 A | 5/1950 | Edgar | 280/244 |
| 4,303,255 A * | 12/1981 | Thomas | 280/234 |
| 4,493,657 A | 1/1985 | Zeitler | 440/28 |
| 4,541,647 A * | 9/1985 | Braun | 280/234 |
| 4,685,692 A * | 8/1987 | Fullilove et al. | 280/234 |
| 5,082,302 A * | 1/1992 | Nacar | 280/234 |
| 5,328,195 A | 7/1994 | Sommer et al. | 280/233 |
| 5,383,675 A * | 1/1995 | Liebert | 114/144 R |
| 5,387,140 A | 2/1995 | Cunningham | 280/288.4 |
| 5,415,574 A | 5/1995 | Siviero | 440/12 |
| 5,511,810 A * | 4/1996 | Tong | 280/233 |
| 5,522,741 A | 6/1996 | Yun | 440/29 |
| 5,542,689 A | 8/1996 | Chalfant | 280/242.1 |
| 5,547,406 A | 8/1996 | White | 440/12 |
| 5,830,020 A | 11/1998 | Snyder | 440/12 |
| 6,032,970 A * | 3/2000 | Porter | 280/234 |
| 6,155,584 A * | 12/2000 | Dallet | 280/233 |
| 6,193,253 B1 * | 2/2001 | Barnett | 280/234 |
| 6,264,224 B1 * | 7/2001 | Phillips | 280/234 |
| 6,267,631 B1 | 7/2001 | Anderson | 440/12 |

* cited by examiner

Primary Examiner—Kevin Hurley
Assistant Examiner—L. Lum
(74) Attorney, Agent, or Firm—MacCord Mason PLLC

(57) ABSTRACT

The present invention is a drive mechanism for human powered vehicles. In general, the invention is a unique drive mechanism for any human powered vehicle, such as a bicycle or a human powered boat. The mechanism enables the operator to efficiently apply both arm and leg power for motive force while maintaining the ability to steer using the arms. The mechanism couples the arm and leg motion in a harmonious union similar to a running motion but can be easily uncoupled should the operator prefer to power the vehicle only with leg power. The mechanism enables motive power to be applied with both the up and down stroke of either or both arms. Specifically the drive mechanism has oscillatable handlebars and a linkage connectable to the drive of the human powered vehicle.

23 Claims, 2 Drawing Sheets

HUMAN POWERED VEHICLE DRIVE MECHANISM

BACKGROUND OF THE INVENTION (1) Field of the Invention

The present invention relates to a drive and steering mechanism for a human powered vehicle. In particular, the invention is well suited for human powered vehicles that allow a rider to drive forward by transferring power from upper and lower body muscle groups using a smooth natural motion similar to running.

(2) Description of the Prior Art

Human powered vehicles, such as bicycles or boats and other water vehicles, are known in the art and are generally comprised of a frame for supporting the rider, a drive means for providing thrust, a steering means, and a power linkage with which the rider can transfer muscle-generated power to the drive means. The power may be generated by movement of the arm, the legs or both arms and legs.

Bicycles, for example, are normally constructed of a frame, a drive means comprised of a leg powered, pedal-driven rotatable sprocket that is connected by a continuous chain to a second sprocket communicating with the rear bicycle wheel, and handlebars that are attached to a fork supporting a steerable front wheel. It is also known to supplement the power of the rider's legs by providing a linkage from the handlebars to the drive means or to the front wheel of the bicycle, so that movement of the handlebars by the rider's arms creates an additional propelling force. The following list of U. S. patents disclose various drive mechanisms for converting handlebar motion, other than steering motion into forward motion of a bicycle or tricycle.

| | |
|---|---|
| 377,610 | Goodsell |
| 384,150 | Goodsell |
| 585,421 | Bemis |
| 616,021 | Schaibly |
| 690,180 | Pierson |
| 2,207,305 | Souhart |
| 2,416,092 | Genin |
| 2,510,013 | Edgar |
| 5,328,195 | Sommer et al. |
| 5,542,689 | Chalfant |

Of particular interest is U.S. Pat. No. 377,610 to Goodsell, which discloses an oscillating drive mechanism for a velocipede. A rod linkage transmits forces from the velocipede's handlebars to a ratchet coaxially fixed to a foot pedal crank. The disclosed ratchet drive only transfers power on a down stroke of one side of the handlebars. A down stroke of the other side of the handlebars is a resting stroke.

Another patent to Goodsell, U.S. Pat. No. 384,150 replaces the ratchet drive with a friction clutch. However, the friction clutch does not increase the efficiency of power transfer because like Goodsell's previous ratchet design, only a down stroke of one side of the handlebars transfers power. Furthermore, both patents disclose mechanisms that are asynchronous relative to the motion between the handlebars and foot pedals.

Yet another patent of interest is U.S. Pat. No. 2,510,013 to Edgar that discloses a bicycle having a linkage connecting a crank and pedal to a complex steering apparatus having a pair of handlebar levers that function as steering inputs as well as rockers for converting a bobbing motion of a rider's upper body into rotary motion driving the rear wheel of a bicycle. The bobbing motion of the rider's upper body forces both handlebar levers up and down in unison. The pedal movements are synchronized to the movements of the handlebar levers by the linkage connecting the crank and pedal to the steering apparatus.

The following patents are representative of prior art human powered drive mechanisms used to propel boats:

| | |
|---|---|
| 6,267,631 | Anderson |
| 5,830,020 | Snyder |
| 5,547,406 | White |
| 5,522,741 | Yun |
| 5,415,574 | Siviero |
| 5,387,140 | Cunningham |
| 4,493,657 | Zeitler |
| 621,465 | Storms |
| 547,422 | Dean |

However, in spite of the numerous human powered drive mechanisms described in the prior art, there is still a need of a drive mechanism that enables the rider to apply continuous leg and arm forces to a drive means through the entire thrust cycle, with the foot and arm movements being synchronized so that the two movements supplement each other instead of counteracting each other. There is a further need for a drive mechanism that that will not interfere with steering of the vehicle during use. In addition, there is a need for a drive mechanism that includes an arm powered section that can be readily disengaged when the supplemental power is not desired, and later reengaged.

SUMMARY OF THE INVENTION

The present invention addresses these needs by providing a unique drive and steering mechanism for human powered vehicles, such as a bicycle or a human powered boat. The mechanism enables the operator to efficiently apply both arm and leg power for motive force while maintaining the ability to steer using the arms. The mechanism couples the arm and leg motion in a harmonious union similar to a running motion but can be easily uncoupled should the operator prefer to power the vehicle only with leg power. The mechanism enables motive power to be applied with both the up and down stroke of both arms. The mechanism is mechanically simple and is well suited to be applied to new vehicle designs as well as added on in kit form to existing vehicles, such as standard bicycles. The mechanism maintains the time tested spatial relationship between the seat, handlebars, and drive pedals of a standard bicycle, as well as the time tested and simple rotatable handlebar steering of a standard bicycle.

It should be noted that this invention allows arm forces to be applied to the handlebars without unintentionally applying substantial turning forces to the handlebars, then, through the use of a unique linkage mechanism that maintains the above-mentioned spatial relationship, couples these forces with those applied by leg power to the foot pedals. It should also be noted that although the invention is shown applied to a standard bicycle, the mechanism could be used to power and steer human powered vehicles having a recumbent position. Existing technology such as chain, gears and universal joints can be relatively easily arranged to accommodate the different relative locations of steering elements, such as front wheels and rudders, and drive elements, such as rear wheels and propellers. In general, the invention can be used with any type of human powered vehicle having a drive that includes a rotatable front sprocket or shaft used to transmit torque to wheel(s) or propeller(s) or in anyone of several established manners, such as gears, belts or chains.

In general, the drive mechanism of the invention is comprised of foot-powered section; an arm-powered section, which is also used for steering; a linkage joining the arm and foot sections; and a thrust component operatively connected to the foot-powered section. The specific construction of each of the drive mechanism elements will depend upon the type of vehicle being driven and its design. For example, the thrust component of a bicycle may be comprised of a chain-driven rear wheel operatively connected to the foot-powered section by a chain drive, while the thrust section of a boat may be comprised of a propeller connected to the foot-powered section by a rotatable shaft. Also for steering input, the arm-powered section may be connected to the front wheel of a bicycle, or to the rudder of a boat.

The foot-powered section is broadly comprised of a generally horizontal, rotatable axle that is operatively connectable to the thrust component, with left and right foot-powered pedals being connected to the axle, e.g., at opposite ends of the axle, by oppositely extending crank handles. The pedals are 180° out of phase and travel in circular paths so that the right pedal is at its lowermost position when the left pedal is in its uppermost position, and vice versa. A sprocket or a gear can be attached around the axle to connect the axle to the thrust component.

The arm-powered section is broadly comprised of handlebars having integral left and right outer sections. The handlebars are pivotally connectable to a steering post so that the bars can oscillate on the post with each outer section being moveable between raised and lowered positions. Since the sections are integral, the right bar section will be in its lowermost position when the left bar section is in its uppermost position, and vice versa.

The foot-powered and arm-powered sections are connected so that the left pedal will be in its lowermost position when the right handlebar section is in its lowermost position and the right pedal will be in its lowermost position when the left handlebar section is in its lowermost position. As a result of this relationship, the relationship of the handlebar sections to each other, and the relationship of the pedal sections to each other, the rider is able to exercise a running motion when rotating the pedals and simultaneously oscillating the handlebars, thus creating a continuous cooperative relationship between the arm-powered and foot-powered sections permitting pushing down on the pedal of one side while pulling up with opposing force on the handlebar of that same side.

The exact configuration of the linkage joining the foot-powered section to the arm-powered section will vary somewhat depending on the type of vehicle and its overall construction. Generally, howvever, the linkage will be comprised of a pivotal first section having a first end attached by a flexible link to a handlebar section and an opposed second end, and a second section having a first end pivotally attached to the second end of the first section and a second end attached to a crank of the foot-powered section. The first section is comprised of telescoping inner and outer components, with the inner component being rotatable within the outer component, so that the handlebars can be turned to steer the vehicle.

In operation, the rider pushes downward on one of the pedals, e.g., the left pedal, while sinultanieously pulling up on the same side handlebar section and pushing downward on the opposite handlebar section, i.e., the right handlebar section. As the right handlebar section is moved downward, the first end of the first linkage section is pulled upward, pivoting the second end of the first section downward, thereby pushing the second linkage section downward against the left pedal crank to supplement the foot force being applied by the rider. When the left pedal and the right handlebar section simultaneously reach their bottommost positions, the rider pressed downward on the right pedal and the left handlebar section to continue application of force to, and rotation of, the axle to which the pedals are attached.

If desired, the linkage can be disconnected when use of the arm-powered section for driving purposes is not desired. When disconnected from the foot-powered section, the arm-powered section is used only for steering purposes and does not oscillate when the pedals are rotated. In this alternative, the second linkage section is comprised of first and second telescoping sections, with a first releasable latching means to secure the sections together and prevent telescoping or disconnected to permit telescoping when the handlebars are latched in position. A second releasable latching means is used to prevent oscillation of the handlebars on the steering post.

Each latching means is movable between engaged and disengaged positions, with one latching means being in the engaged position when the other latching means is in the disengaged position. A control means, such as a lever, which may be the first portion of the rear brake lever preceding brake application, connected to both latching means, to simultaneously move one latching means to the engaged position while moving the other latching means to the disengaged position. Thus, when disconnection of the linkage is desired, the lever is moved to disconnect the first latching means, permitting free movement of the two sections comprising the second linkage section, while latching the handlebars to the steering post to prevent oscillation. These latch positions can then be reversed to reengage the linkage connection.

While it is to be understood that the present drive mechanism is generally useful with various types of human powered vehicles, it will be described in the context of a bicycle for purposes of illustration. Generally, a bicycle is constructed of a frame of elongated tubes, including a head tube, a top tube, a down tube, a seat tube and a rear fork. The top end of the head tube is usually connected substantially perpendicular to a top tube and the bottom end of the head tube is connected to the down tube such that it slopes downwardly away from the top tube. A seat tube substantially perpendicular to the top tube collects the down tube to the top tube.

The foot-powered drive mechanism includes a front sprocket connected to an axle having a left side crank with a left side pedal and a right side crank with a right side pedal. Both pedals are rotatable along circular pathways between the top and bottom positions. The left side pedal is in the bottom position when the right side pedal is in the top position. The axle is rotatably attached to the bicycle frame through a bearing bracket joining the bottom ends of the down tube and the seat tube.

A rear sprocket is centrally attached to a rear wheel mounted to the rear fork of the bicycle frame. Normally, an endless chain connects the front sprocket to the rear sprocket. However, other drives, such as a drive shaft, can be used.

A fork mounted at the front of the bicycle frame includes a steering post at its top end that extends through and above the head tube. The bottom section of the front fork extends from the bottom end of the head tube in an arc away from and to the front of the head tube. A front wheel is rotatably mounted on the front fork's bottom end handlebars are securely attached to the top of the steering post to rotate the post and thereby turn the front wheel to steer the bicycle.

Unlike a standard bicycle, the handlebars in the present invention are also oscillatable, and are linked to the foot-powered section to provide supplementary drive power to the sprocket. Specifically, the handlebars of the bicycle incorporating the present drive mechanism have integral left and right arm sections that extend to opposite sides of a central pivot point. The handlebars are pivotally attached through the central pivot point to the steering post near its top end. The left and right arm sections of the oscillatable, handlebars each have a top position and a bottom position. The left arm section is in the top position when the right arm section is in the bottom position. The left and right side pedals also have top and bottom positions.

A yoke secures the handlebars so that they remain transverse to the front wheel's plane of rotation for all steering angles. The yoke also substantially limits the handlebars to a plane of oscillation that substantially contains the center-line of the steering post, so that force in this plane applies little or no steering torque to the steering output. In some configurations, as with a bicycle with a "rake" angle, it may be advantageous to move this plane slightly in a direction toward a point where the tire of the front wheel contacts to ground.

The linkage basically comprises a generally horizontal telescoping first member section having a front end and a rear end and a generally vertical pinned telescoping second member section having a top end and a bottom end. The first member section is pivotally attached roughly midway between its first and second end to a bicycle's top tube intermediate the head tube and the seat tube. The front end of the first member is pivotally attached to one of the handle bar sections and the second end of the first member is pivotally attached to the top end of the second member and the bottom end of the second member is attached to the drive.

The linkage connects the handlebars to the drive, whereby one full oscillation of the handlebars in cooperation with forces applied to the pedals rotates the sprocket one full revolution. Whenever a rider moves the handlebar left arm section to the top position the left pedal will be in the bottom position. A full oscillation of the handlebars occurs when either handlebar arm section travels once from its top position to its bottom position and back to its top position. One full oscillation of the handlebars also occurs when the front sprocket rotates through a 360° cycle. Moreover, the linkage connecting the handlebars to the drive and pedals force the left arm section of the handlebar into the top position whenever the left pedal is in the bottom position.

The linkage attaches to one of the handlebars arm members at a point substantially distant from the handlebars central pivot point creating a lever arm for transferring power to the chain drive. The length of the lever arm, i.e. the distance from the handlebars pivot point to the attachment point of the linkage is predetermined to maximize handlebar power transfer while at the same time provide adequate steering.

In an embodiment of the present invention the linkages are constructed from metal rods and a tubular sleeve. One linkage rod referred to in this disclosure as a first telescoping rod is pivotally attached to a handlebar arm section by a universal joint allowing the attached end of the first telescoping rod to pivot left and right as the bicycle is steered, as well as up and down as the handlebars are oscillated. The connection between the handlebars and the first telescoping rod need not be limited in mechanical degrees of freedom. For example, the universal joint used in an embodiment of the invention is made of metal but the connecting of the linkage could be accomplished just as well by using a flexible material such as rubber. The first telescoping rod is also free to rotate within the drive sleeve.

In the preferred embodiment, the first telescoping rod is connected to the left arm section of the handlebars. The first telescoping rod slides and rotates within a tubular sleeve allowing for large steering angles. The sleeve referred to as the first drive sleeve is pivotally attached to the top tube of the bicycle frame or the pivot may be otherwise supported, such as by a compression bar to the down tube and simply stabilized by the top tube which would allow the present invention to be attached to and function properly with a recumbent bicycle or human powered boat, etc. The pivotal attachment of the first drive sleeve allows the rear end of the sleeve to arc upward or downward as the front end of the first telescoping rod arcs upward or downward, forced by the universal joint to follow the upward or downward movement of the handlebar left arm section. This pivot allows for roughly 20° of pivoting in the vertical plane but also must allow a lesser degree of pivoting in the horizontal plane.

Pivotally connected to the rear end of the first drive sleeve is a second drive sleeve. The second drive sleeve receives a pinnable second telescoping drive rod with a rigidly attached drive bar, both extending downward to the left side crank. The drive bar has a bearing attached to its bottom end. The bearing is rotatably connected to a shaft rigidly coupling a crank pedal segment to an axle crank segment both belonging to the left side crank.

To instantly convert the functioning dual powered drive to a foot-powered only drive, a pair of latcles, such as simple pins or cogs or the like, can be activated by a mode lever convenient to one hand such that the second telescoping drive rod will be unpinned and allowed to telescope, thus freewheeling the leg drive from the arm drive. Instantly thereafter, the handlebars attached to the yoke will be pinned or locked to a steering post clamp. In this configuration the bicycle or other type of human powered vehicle will steer and pedal in the normal fashion. The mode lever has two positions, an engaged position and a disengaged position. The engaged position is for releasing the handlebars to pivot while locking the second telescoping drive rod. The disengaged position is for locking the pivotal handlebars while releasing the second telescoping drive rod.

When in operation with the mode lever in the engaged position, two continuous cooperating forces combine in rotating the front sprocket. One force is transferred from the handlebars to the front sprocket by the drive mechanism linkage and the other force applied to the front sprocket comes directly from the pedals. As a rider forces the left side handlebar section downward the front end of the first telescoping rod is forced to arc downward. The rear end of the first telescoping rod being inside the drive sleeve forces the rear end of the drive sleeve to travel in an upward arc pulling the pinned second telescoping drive rod and drive bar upward. The front sprocket rotates as the end of the drive bar pulls the left side crank. At the same instant the right side crank and pedal are forced downward by the right foot of the bicycle rider generating a cooperating force adding to the rotation of the front sprocket.

Conversely, as the rider forces the right side handlebar section downward the front end of the first telescoping, rod is forced to arc upward forcing the rear end of the first drive sleeve to travel downward, thus pushing the second drive sleeve and pinned second drive rod with drive bar downward. The front sprocket rotates as the end of the drive bar pushes the left side crank.

Thus, it is an aspect of the invention to provide a drive mechanism for a human powered vehicle that gives a rider an upper as well as a lower body exercise "workout". The linkage for the drive mechanism has been designed such that the rider moves his or her body in a natural way that does not require any extensive practice to use the invention.

However. if the rider chooses he or she can to drive the bicycle in the normal fashion of pedal propulsion only with the pivotable handlebars locked in a standard steering position, the rider only needs to disengage the drive mechanism by moving the mode lever to the disengaged position. If on the other hand, the rider desires maximum speed or is on an uphill run where the dual drive aspect of the invention is so advantageous, the mode lever can be moved back to the engaged position releasing the pivotable handlebars and instantly thereafter pin or lock the telescoping drive rod to couple the motion of the pivotable handlebars to the sprocket.

An important aspect of the current invention is the natural spatial relationship between the typical bicycle's seat, steering handlebars, and drive pedals as they correspond to a comfortable placement for contact with the human buttocks, hands and feet. It is another aspect of the invention to provide a drive mechanism that is a retrofit kit or add-on kit for the owner of a standard bicycle. Other aspects of the invention will become apparent to one skilled in the art upon a reading of the following detailed description of the invention, taken with the drawings.

DETAILED DESCRIPTION OF THE PREFERRED EMBODIMENT

In the following description, terms such as left, right, top, bottom and the like are used solely for the purpose of clarity in illustrating the invention, and should not be taken as words of limitation. The drawings are for the purpose of illustrating the invention and are not intended to be to scale.

Figure 1:
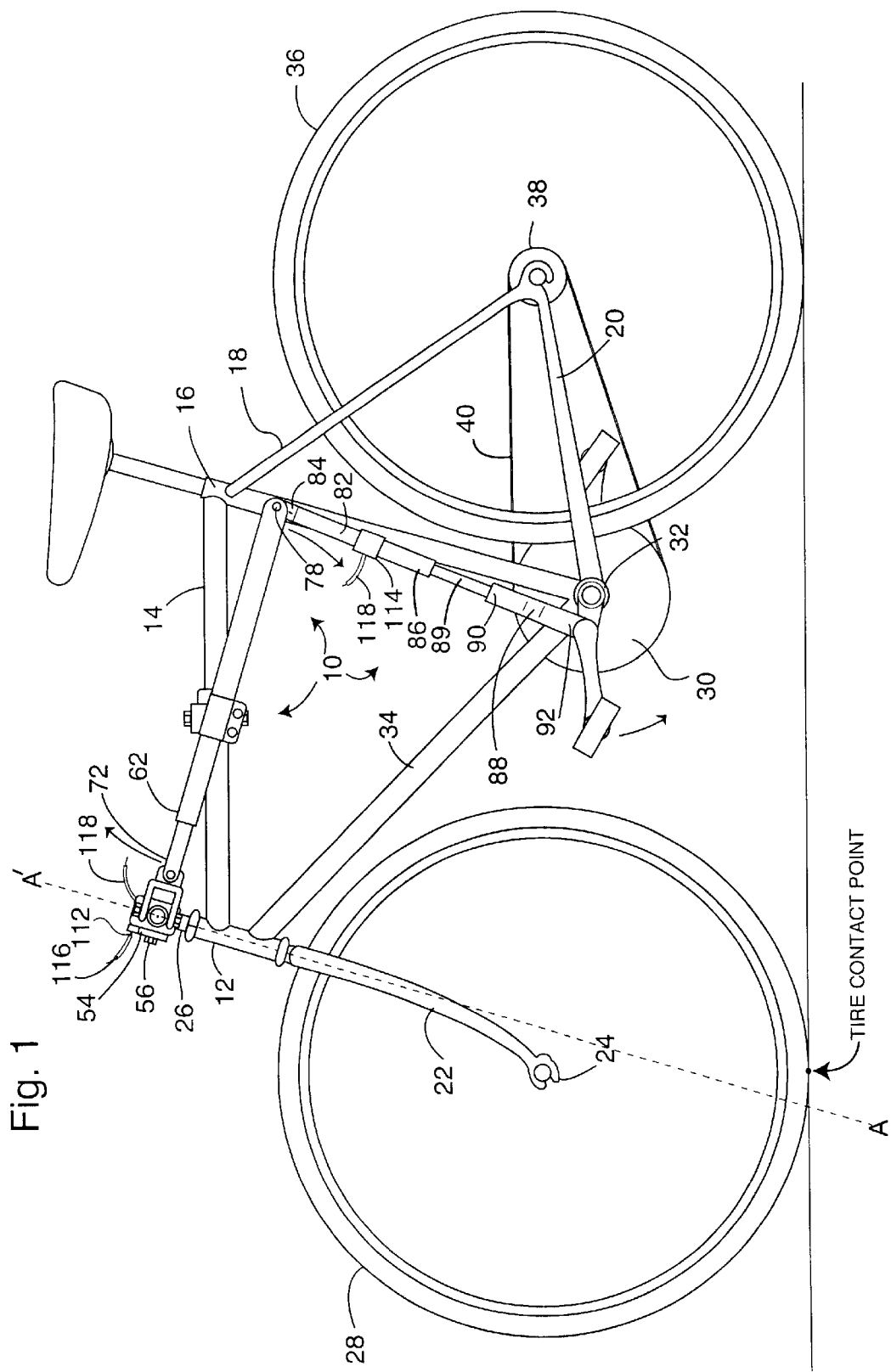
FIG. 1 is a side view of a bicycle including the present invention.

The present invention is a drive mechanism generally 10, for a human powered vehicle having a rotating foot pedal drive. FIG. 1 shows a side view of a human powered vehicle in the form of a bicycle including drive mechanism 10.

The bicycle has a planar frame built from a head tube 12, a top tube 14, a seat tube 16, seat stays 18 and a rear fork 20. The bicycle further includes a front fork 22 having a bottom end 24 and a steering post 26 rotatably mounted through head tube 12. A front wheel 28 is mounted to front fork 22. A front sprocket 30 is mounted to an axle bearing bracket 32 connecting seat tube 16 to a down tube 34. A rear wheel 36 having a rear sprocket 38 is mounted to the real Cork 20. An endless chain 40 connects front sprocket 30 to rear sprocket 38. A front view of the bicycle shown in FIG. 2 depicts front sprocket 30 further including an axle 42 having a left side crank 44 with a left side pedal 46 and a right side crank 48 with a right side pedal 50.

Figure 2:
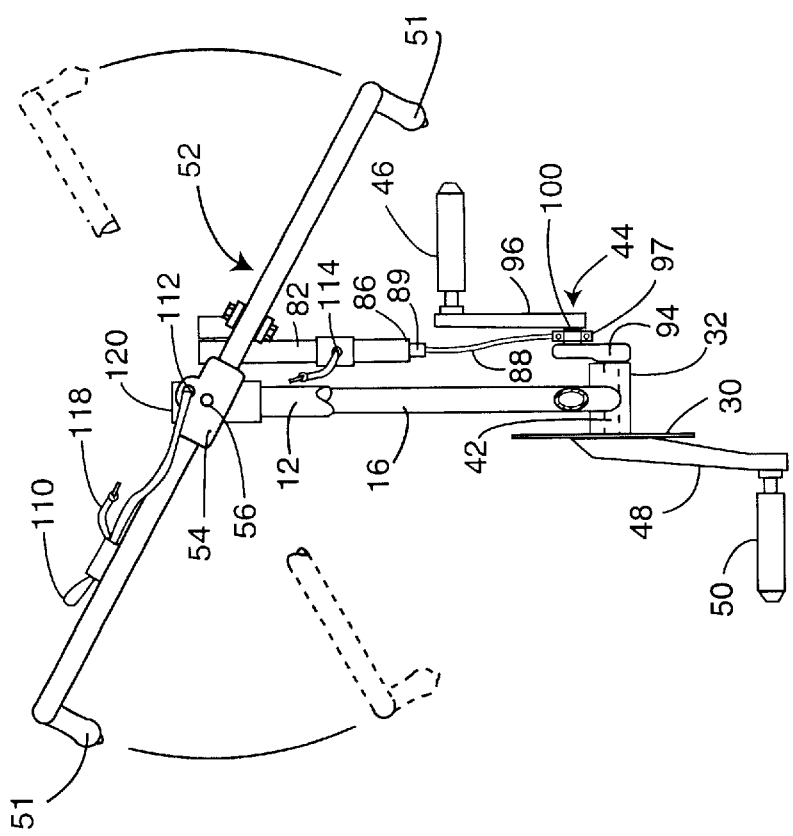
FIG. 2 is a front view of a bicycle depicting the oscillatable handlebars and their range of motion.

As shown in FIGS. 1 and 2, oscillatable handlebars 52 are pivotally attached to steering post 26 attached to front fork 22 A yoke 54 limits handlebars 52 to a plane of oscillation substantially containing centerline A—A as shown in FIG. 1. Yoke 54 also insures that handlebars 52 remain transverse front wheel 28 for all steering angles of front fork 22 Hand brakes 51 are attached to handlebars 52 as shown in FIG. 2.

Figure 3:
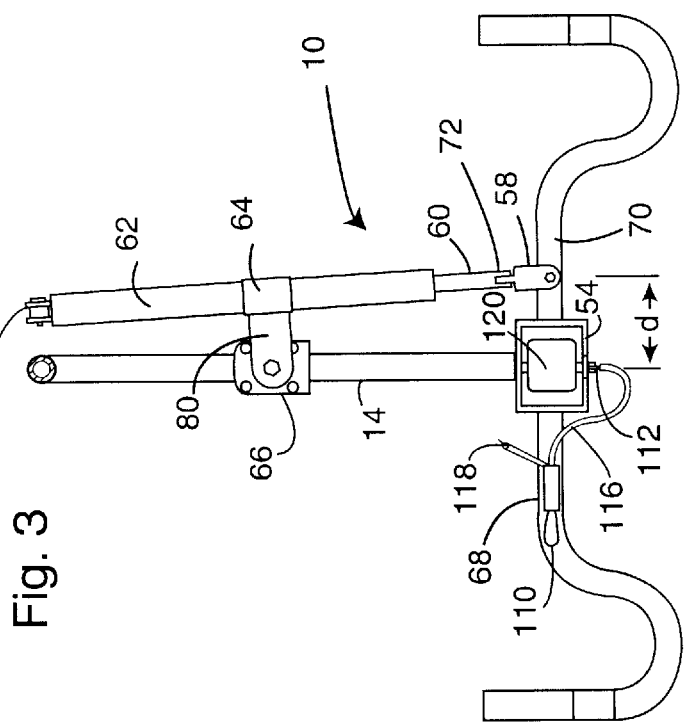
FIG. 3 is a top view of a bicycle showing linkage elements of the drive mechanism attached to the oscillatable handlebars.

FIG. 3 shows a partial top view of drive mechanism 10 including bicycle frame top tube 14. Drive mechanism 10 elements depicted in FIG. 3 include a universal joint 58, an elongated first telescoping drive rod 60, a first drive sleeve 62, a sleeve clamp 64, a bracket assembly 66, and integrated handlebars 52 consisting of a right side arm section 68 and a left side arm section 70. Universal joint 58 is pivotally attached to left side handlebar at a predetermined distance "d" away front pivot point 56. Predetermined distance "d" is a moment arm that allows forces to be developed on universal joint 58 whenever handlebars 52 are oscillated about pivot point 56.

First telescoping rod 60, having a front-end 72 is pivotally attached by front-end 72 to universal joint 58. An elongated first drive sleeve 62 having a front-end 72 and a rear end 78 receives telescoping rod 60. As shown in FIGS. 1 and 3, first drive sleeve 62 is pivotally attached to top tube 14 by sleeve clamp 64 and adjustable bracket assembly 66. Sleeve clamp 64 attaches around first drive sleeve 62 approximately midway between front-end 76 and rear end 78. Adjustable bracket assembly 64 is attached to the bicycle frame top bar 14 approximately midway between seat tube 16 and head tube 12. A right angle brace 80 belonging to bracket assembly 66 pivotally connects clamp 64, and first drive sleeve 62 to top tube 14.

Referring back to FIG. 1, an elongated second drive sleeve 82 having a top end 84 and a bottom end 86 is pivotally attached by top end 84 to rear end 78 of first drive sleeve 62. An elongated drive bar 88 having a top end 90 and a bottom end 92 is rigidly attached to bottom end 86 of a second telescoping drive rod 89. Drive bar 88 has a slight double bend outward relative to the bicycle's frame beginning approximately midway between top end 90 and bottom end 92. Best seen in FIG. 2, the double bend in drive bar 88 allows bottom end 86 of second drive sleeve 82 to pass by left side crank 44 whenever second drive sleeve 82, drive bar 88 and left side crank 44 are in motion.

The left side crank is non-standard, comprising an axle segment 94, a pedal segment 96 and a bearing 97 over shaft 100 rigidly coupling pedal segment 96 to axle segment 94. Bottom end 92 of drive bar 88 is rotatably connected to shaft 100. Taken together, universal joint 58, first telescoping rod 60, first drive sleeve 62, second drive sleeve 82, drive bar 88, second telescoping rod 89 and left side crank 44, make up a linkage connecting left pedal 46 to handlebars 52. The linkage described above along with bracket assembly 66, clamp 64, right angle brace 80 and the left side crank made up of shaft 100, pedal crank section 96 and crank axle section 94 further make up drive mechanism 10, which can be supplied in kit form along with handlebars 53 and related components to retrofit a standard bicycle with an embodiment of the present invention.

A system for engaging and disengaging drive mechanism 10 is made up of a mode lever 110, handlebars locking pin 112, second telescoping rod locking pin 114, handlebars control cable 116 and second telescoping rod control cable 118. Mode lever 110 is in communication handlebars locking pin 112 and second telescoping rod locking pin 114 by way of control cable 116 and control cable 118 respectively. Mode lever 110 has an engaged position and a disengaged position. With mode lever 110 in the engaged position, second telescoping rod 89 is pinned and locked such that forces applied to second drive sleeve 82 are transferred to drive bar 88. At the same time, handlebars locking pin 112 is pulled from a steering post clamp 120 freeing oscillatable handlebars 52 such that they can rock about pivot point 56. With mode lever 110 in the disengaged position, locking pin 114 is removed from second telescoping rod 89 unpinning it such that it does not transfer forces to drive bar 88. Simultaneously, handlebars 52 are pinned and locked to steering post clamp 120. When pinned, handlebars 52 arc locked in a position midway between the arm sections' top and bottom positions or in other words locked in a standard bicycle handlebar position.

In operation, as shown in FIG. 2 handlebar arm section 68 is its top position whenever handlebar arm section 70 is in its bottom position. Similarly, left side pedal 46 is in its top position whenever right side pedal 50 is in its bottom position. As best seen from FIG. 1 telescoping rod end 72 arcs upwards whenever left side arm segment 70 travels towards its top position. As a result, drive sleeve end 78 arcs downward pushing drive rod 82 and drive bar 88 downward forcing pedal 46 towards its bottom position. Axle 42 carries this motion to right side crank 48 sending pedal 50 towards its top position.

Modifications or substitutions can be made to drive mechanism 110 without departing from the essence of the invention. For example, the telescoping rod could be replaced with a telescoping sleeve and the drive sleeve would become the received rod. Furthermore, a single drive bar could replace second drive rod 82 and drive bar 88. The linkages and other elements could be made from diverse materials such as high strength plastics, metals or composite materials. It will be obvious to one skilled in the art that many modifications and variations can be made to the present invention without departing from its spirit and scope. Therefore, the invention is not to be limited by the description of the preferred embodiment, but is to be limited only by the scope of the following claims.

What is claimed is:

1. A drive mechanism for a human powered vehicle comprising:
   a) a rotatable axle connectable to a thrust component;
   b) left and right pedals attached by crank arms to said axle and positioned 180° out of phase, said arms being rotatable along circular pathways between raised and lowered positions, said left pedal being in the lowered position when said right pedal is in the raised position;
   c) oscillatable handlebars having integral left and right sections, each of said sections having a raised position and a lowered position, said left section being in the raised position when the right section is in the lowered position; and
   d) a linkage connecting said axle to said handlebars, wherein said linkage is disconnectable from said axle and said oscillatable handlebars are latchable to prevent oscillation, and whereby said handlebar left section is in its raised position when said left pedal is in its lowered position.

2. The drive mechanism of claim 1, wherein said linkage comprises a pivotable first section having a first end attached by a flexible link to a handlebar section and an opposed second end, and a second section having a first end pivotally attached to said second end of said first section and a second end attached to one of said crank arms.

3. The drive mechanism of claim 1, wherein said linkage comprises a telescoping first elongated member having front and rear ends and a second elongated member having top and bottom ends, said first member being pivotally attached generally midway between said front and rear ends.

4. The drive mechanism of claim 3, wherein said second elongated member is comprised of first and second telescoping sections, said vehicle further including latching means for disconnecting said second member sections while securing said handlebars from oscillation.

5. The drive mechanism of claim 3, wherein said first elongated member is pivotally attached between its front and rear ends.

6. The drive mechanism of claim 1, wherein one oscillation of said handlebars occurs during one rotation of said pedals.

7. A human powered vehicle comprising:
   a) a foot-pedal section having a rotatable axle connected to a thrust component, and with left and right pedals attached by crank arms to said axle, said pedals rotatable along circular pathways between raised and lowered positions, said left pedal being in its lowered position when said right-pedal is in its raised position;
   b) an arm-powered section having oscillatable handlebars with integral left and right arm sections, each of said arm sections having a raised position and a lowered position, said left arm section being in its raised position when said right arm section is in its lowered position; and
   c) a linkage connecting said axle to said handlebars, wherein said linkage is disconnectable from said axle and said oscillatable handlebars are latchable to prevent oscillation, and whereby said handlebar left arm section is in its raised position when said left pedal is in its lowered position.

8. The human powered vehicle of claim 7, wherein said thrust connection includes a sprocket attached to said axle, a rotatable wheel, and a continuous chain connecting said sprocket and said wheel.

9. The human powered vehicle of claim 7, wherein said linkage is comprised of a pivotal, telescoping first elongated member having a first end attached by a flexible linkage to a handlebar section and an opposed end, and a second elongated member having a first end pivotally attached to the second end of said first member and a second end attached to one of said crank arms.

10. The human powered vehicle of claim 9, wherein said second member is comprised of first and second telescoping sections, said vehicle further including latching means for disconnecting said second member sections while securing said handlebars from oscillating.

11. The human powered vehicle of claim 7, wherein said flexible linkage is a universal joint.

12. The human powered vehicle of claim 7, wherein said first member is pivotally attached approximately midway between its first and second ends.

13. The human powered vehicle of claim 7, wherein said human powered vehicle is a bicycle.

14. A bicycle comprising:
   a) a frame;
   b) a front wheel fork having a steering post;
   c) a front wheel carried on said fork;
   d) a foot-powered drive mechanism comprising an axle, a sprocket carried by said axle, left and right pedals attached by crank arms extending in opposite directions from said axle, each of said crank arms being rotatable in a circular pathway so that the pedal carried on said crank arm is rotatable between raised and lowered positions;

e) a thrust connection for propelling said bicycle in communication with said foot-powered drive mechanism;

f) oscillatable handlebars attached to said fork steering post, said handlebars having integral left and right outer sections, each of said handlebar sections having raised and lowered positions, said left handlebar section being in the raised position when said right handlebar section is in the lowered position;

g) a linkage connecting one of said handlebars to one of said crank arms, wherein said linkage is disconnectable from said axle and said oscillatable handlebars are latchable to prevent oscillation, and whereby said left handlebar section is in its raised position when said right pedal is in its lowered position.

15. The bicycle of claim 14, wherein said linkage is comprised of a pivotal, telescoping first elongated member having a first end attached by a flexible linkage to a handlebar section and an opposed end, and a second elongated member having a first end pivotally attached to the second end of said first member and a second end attached to one of said crank arms.

16. The bicycle of claim 15, wherein said second elongated member is comprised of first and second telescoping sections, said vehicle further including latching means for disconnecting said second member sections while securing said handlebars from oscillating.

17. The bicycle of claim 15, wherein said first elongated member is pivotally attached to said frame between its first and second ends.

18. The bicycle of claim 14, wherein said thrust connection is comprised of a sprocket attached to said axle, a rear wheel, and a chain connecting said sprocket to said rear wheel.

19. The bicycle of claim 14, wherein one oscillation of said handlebars occurs during one rotation of said pedals.

20. A drive mechanism for a human powered vehicle comprising:

a) a rotatable axle connectable to a thrust component;

b) left and right pedals attached by crank arms to said axle and positioned 180° out of phase, said arms being rotatable along circular pathways between raised and Lowered positions, said left pedal being in the lowered position when said right pedal is in the raised position;

c) oscillatable handlebars having integral left and right sections, each of said sections having a raised position and a lowered position, said left section being in the raised position when the right section is in the lowered position; and (d) a linkage connecting said axle to said handlebars, whereby said handlebar left section is in its raised position when said left pedal is in its lowered position, said linkage comprising a telescoping first elongated member having front and rear ends and a second elongated member having top and bottom ends, said first member being pivotally attached generally midway between said front and rear ends.

21. The drive mechanism of claim 20, wherein said second elongated member is comprised of first and second telescoping sections, said vehicle further including a latching means for disconnecting said second member sections while securing said handlebars from oscillation.

22. The drive mechanism of claim 20, wherein said first elongated member is pivotally attached between its front and rear ends.

23. A drive mechanism to power and steer a human powered vehicle having a frame with head tube, and front wheel fork having a rotatable steering post extending upwardly through said head tube, and a front wheel carried on said fork, said drive mechanism comprising:

a) a rotatable axle connectable to a thrust component;

b) left and right pedals attached by crank arms to said axle and positioned 180° out of phase, said arms being rotatable along circular pathways between raised and lowered positions said left pedal being in the lowered position when said right pedal is in the raised position;

c) oscillatable handlebars pivotally attached to said rotatable steering post, said handlebars having integral left and right outer sections, each of said handlebar sections having raised and lowered positions, said left handlebar section being in the raised position when said right handlebar section is in the lowered position; and d) a linkage connecting said axle to said handlebars, whereby said handle bar left section is in its raised position when said left pedal is in its lowered position.

* * * * *